(12) United States Patent
Roberts et al.

(10) Patent No.: US 7,641,810 B2
(45) Date of Patent: Jan. 5, 2010

(54) REFRIGERANT COMPOSITIONS

(76) Inventors: Neil Andre Roberts, 10 Howells Mead, Emersons Green, Bristol (GB) BS16 7DT; Owen Ross Chambers, Oak House, Reeds Crescent, Watford Hertfordshire (GB) WD24 4QP ( * ) Notice: Subject to any disclaimer, the term of this patent is extended or adjusted under 35 U.S.C. 154(b) by 0 days.

(21) Appl. No.: 12/125,671

(22) Filed: May 22, 2008

(65) Prior Publication Data

US 2009/0127498 A1     May 21, 2009

Related U.S. Application Data

(62) Division of application No. 11/831,308, filed on Jul. 31, 2007, now abandoned, which is a division of application No. 10/536,987, filed as application No. PCT/GB03/05227 on Dec. 1, 2003, now abandoned.

(30) Foreign Application Priority Data

Nov. 29, 2002 (GB) .................................. 0227891.9
Dec. 4, 2002 (GB) .................................. 0228306.7

(51) Int. Cl.
C09K 5/04 (2006.01)
(52) U.S. Cl. .......................................... 252/68; 252/67
(58) Field of Classification Search .................. 252/67, 252/68
See application file for complete search history.

(56) References Cited

U.S. PATENT DOCUMENTS

| | | | |
|---|---|---|---|
| 3,779,842 | A | 12/1973 | Grunwald et al. |
| 3,869,401 | A | 3/1975 | Ernst |
| 3,986,970 | A | 10/1976 | Shiga |
| 4,297,436 | A | 10/1981 | Kubotera et al. |
| 4,349,411 | A | 9/1982 | Okinaka |
| 4,755,316 | A | 7/1988 | Magid et al. |
| 4,849,124 | A | 7/1989 | Backus |
| 5,032,306 | A | 7/1991 | Cripps |
| 5,091,600 | A | 2/1992 | Moore et al. |
| 5,225,034 | A | 7/1993 | Yu et al. |
| 5,259,979 | A | 11/1993 | Condra et al. |
| 5,342,501 | A | 8/1994 | Okabayashi |
| 5,520,833 | A | 5/1996 | Kaneko |
| 5,688,432 | A | 11/1997 | Pearson |
| 5,705,086 | A | 1/1998 | Ardito et al. |
| 5,866,030 | A | 2/1999 | Reyes-Gavilan et al. |
| 5,954,995 | A | 9/1999 | Goble |
| 5,958,288 | A | 9/1999 | Mueller et al. |
| 6,000,230 | A | 12/1999 | Kanno et al. |
| 6,065,305 | A | 5/2000 | Arman et al. |
| 6,076,372 | A | 6/2000 | Acharva et al. |
| 6,207,071 | B1 | 3/2001 | Takigawa et al. |
| 6,222,136 | B1 | 4/2001 | Appelt et al. |
| 6,230,519 | B1 | 5/2001 | Arman et al. |
| 6,251,300 | B1 | 6/2001 | Takigawa et al. |
| 6,253,577 | B1 | 7/2001 | Arman et al. |
| 6,363,741 | B2 | 4/2002 | Takemasa |
| 6,428,720 | B1 | 8/2002 | Roberts |
| 6,511,610 | B2 | 1/2003 | Caron et al. |
| 6,521,141 | B1 | 2/2003 | Roberts et al. |
| 6,526,764 | B1 | 3/2003 | Singh et al. |
| 6,606,868 | B1 | 8/2003 | Powell et al. |
| 6,629,419 | B1 | 10/2003 | Powell et al. |
| 6,655,140 | B2 | 12/2003 | Oka et al. |
| 6,655,160 | B2 | 12/2003 | Roberts |
| 6,695,973 | B1 | 2/2004 | Musso et al. |
| 6,783,691 | B1 | 8/2004 | Bivens et al. |
| 7,258,813 | B2 | 8/2007 | Roberts et al. |
| 7,276,176 | B2 | 10/2007 | Roberts et al. |
| 2002/0050583 | A1 | 5/2002 | Caron et al. |

FOREIGN PATENT DOCUMENTS

| | | |
|---|---|---|
| CN | 1183451 | 6/1998 |
| CN | 1280166 A | 1/2001 |
| EP | 0399817 B1 | 11/1990 |
| EP | 0430131 A1 | 11/1990 |
| EP | 0427604 B1 | 4/1993 |
| EP | 0539952 B1 | 5/1993 |
| EP | 0659862 A1 | 6/1995 |
| EP | 0565265 B1 | 12/1995 |
| EP | 0779352 A1 | 12/1996 |
| EP | 1184438 B1 | 3/2002 |
| EP | 1193305 A1 | 4/2002 |
| EP | 0856571 B1 | 4/2003 |
| GB | 2247462 A | 4/1992 |
| GB | 2250514 A | 6/1992 |
| GB | 2291884 A | 7/1995 |
| GB | 2327427 A | 1/1999 |
| GB | 9923088.0 | 9/1999 |
| GB | 0005043.5 | 3/2000 |
| GB | 0010171.7 | 4/2000 |
| GB | 2356867 A | 6/2001 |
| JP | 01139675 | 6/1989 |
| JP | 01139678 | 6/1989 |
| JP | 4018484 | 1/1992 |
| JP | 08157809 | 6/1996 |

(Continued)

OTHER PUBLICATIONS

"Final Draft International Standard-Projet Final de Norme Internationale", International Electrotechnical Commission, IEC; Dec. 17, 2004.

(Continued)

*Primary Examiner*—John R Hardee

(57) ABSTRACT

Disclosed is a non-flammable refrigerant composition consisting of pentafluoroethane in an amount from 62-70% based on the weight of the composition selected from 1,1,1,2-tetrafluoroethane, 1,1,2,2-tetrafluoroethane, or a mixture thereof in an amount from 26 to 36% by weight based on the weight of the composition and mixture of dimethyether and n-butane in an amount of from 1-4% by weight based on the weight of the composition. Optionally, the composition may include at least one lubricant, at least one additive or combinations thereof.

13 Claims, 6 Drawing Sheets

FOREIGN PATENT DOCUMENTS

| | | | |
|---|---|---|---|
| JP | 2576161 B2 | | 1/1997 |
| JP | 2576162 | | 1/1997 |
| JP | 2584337 B2 | | 2/1997 |
| JP | 1997059611 A | | 3/1997 |
| JP | 09125052 A | | 5/1997 |
| JP | 01108291 | | 10/1997 |
| JP | 11181414 A | | 7/1999 |
| JP | 3127138 B2 | | 1/2001 |
| JP | 2002228307 A | | 8/2002 |
| JP | 3754198 B2 | | 12/2005 |
| KR | 1997-022058 | | 5/1997 |
| RU | 2072382 C | | 1/1997 |
| RU | 2135541 | | 8/1999 |
| RU | 2161637 C2 | | 10/2001 |
| WO | WO 92/01762 | * | 2/1992 |
| WO | 93/01152 A2 | | 1/1993 |
| WO | 93/15163 A1 | | 8/1993 |
| WO | 94/00529 A1 | | 1/1994 |
| WO | 95/08602 | | 3/1995 |
| WO | WO 95/24451 | * | 9/1995 |
| WO | 96/03473 A1 | | 2/1996 |
| WO | 96/15205 A1 | | 5/1996 |
| WO | 97/34961 | | 9/1997 |
| WO | 98/02370 A1 | | 1/1998 |
| WO | 00/56834 | | 9/2000 |
| WO | 01/23491 A1 | | 4/2001 |
| WO | 01/23492 A1 | | 4/2001 |
| WO | 01/23493 A1 | | 4/2001 |
| WO | 02/24829 A1 | | 3/2002 |
| WO | 02/26912 A | | 4/2002 |
| WO | 02/26913 A2 | | 4/2002 |
| WO | 2004/050787 A1 | | 6/2004 |

OTHER PUBLICATIONS

ASHRAE Standard 34-2001, "Contents", pp. 7 and 13.
Birett K, "Information sheets on hazardous substances" (1996).
Butler D., "R22 drip-in a success at BRE", Refrigeration and Air Conditioning, pp. 49-50 (1994).
Database WPI, Section Ch, Week 8928, Derwent Publications Ltd., London GB; Class E19, AN 89-202050, XP002078229 & JP 01 139675 A (Asahi Glass Co.T Ltd.), Jun. 1, 1989, see abstract.
E-mail reply from Herrick Conference to Felix Flohr dated May 27, 2003.
Fluorocarbon azeotropes, Research Disclosure 16265 (1977).
Musso E et al., "Miscele ternarie a base di HFC contenenti idrocarburi come sostituti "drop in" di R12 nella refrigerazione domestica", Conference on Conditioning, Heating, Refrigeration: Innovations and Trends, Milan, Italy (1997).
Pearson SF, "Uses of hydrocarbon refrigerants", I.I.F.-I.I.R. Commissions B1, B2, E1 and E2, pp. 439-446 (1996).
R417A—M6DS Sheet (Product available circa 2001).
Roberts NA et al, "High Efficiency R22 Replacement", Conference at Purdue University (1996).
Roberts NA, "Determination of the performance, leak scenario, flammability and oil return characteristics of novel R22 replacement", Proceedings of the Seventh International Refrigeration Conference at Purdue University, West Lafayette, Indiana (1998).
Roberts, NA, Pearson, SF; "High Efficiency R22 Replacement (ISCEON 59, a mixture of R125, R134a and isobutane)"; Congress Symposium Meeting-Colloque, 1996 Int. Compressor Eng. Conf., Purdue, Jul. 23, 1996.
Roberts, NA; "Energy Saving Refrigerant Blends Comprising R125, R134a, R600 or R600a"; European Conference (Milan); pp. 108; Jun. 17-18, 2005.
Sanders PA., "Table 14-2 Flammability Limits of Various Propellants in Air", Handbook of Aerosol Technology, Second Edition, Malabar, Florida, pp. 233, 250 (1987).
Soffientini et al., "Evaluation of alternative refrigerants when retrofitting R-22 refrigeration systems", Centro Studio Galileo—Industria & Formazione Eleventh European Conference, Milan, Italy (2005).
Sworn Statement by Christoph Meurer.
Wilson, DP, Richard, RG; "Determination of Refrigerant Lower Flammability Limits in Compliance with Proposed Addendum p to Standard 34"; ASHRAE Transactions 2002, v. 108; pp. 1-17; Jun. 23, 2002.

* cited by examiner

REFRIGERANT COMPOSITIONS

This application is a divisional application of U.S. application Ser. No. 11/831,308, filed Jul. 31, 2007 now abandoned, which is a divisional application of Ser. No. 10/536,987 filed Nov. 4, 2005, (now abandoned), which is the United States national phase application of PCT/GB/03/05227, filed Dec. 1, 2003, which is based upon Great Britain Applications No. GB 0227891.9, filed Nov. 29, 2002, and GB 0228306.7, filed Dec. 4, 2002. The contents of all the above applications are incorporated herein by reference in their entirety.

This invention relates to refrigerant compositions, particularly compositions which can be used for chillers. In particular, these are devices for producing chilled water or aqueous solutions at temperatures typically from 1 to 10° C.

Chillers require large amounts of cooling. Recently R22 ($CHClF_2$) has been used for this purpose. However, there is the need for an alternative refrigerant, since R22 is an ozone depleter that will be phased out over the next decade, in accordance with Montreal protocol.

Therefore, there is a requirement for a refrigerant that has similar properties to R22, but is not an ozone depleter. Of particular concern is that the temperature/vapour pressure relationship for such a refrigerant should be sufficiently similar to R22 that it can be used in R22 equipment without having to change the control systems which are usually programmed in the factory making the chiller.

This is of particular concern for systems that have sensitive control devices, which rely on both the inlet pressure to the expansion valve and the outlet pressure. These control systems are based on R22 properties. Therefore, if an R22 substitute does not have a temperature/vapour pressure behavior similar to R22, the system will not operate correctly.

By similar we mean that the vapour pressure of the substitute should not differ by more than ±12% and preferably not more than ±6% at any given mean evaporating temperature between −40° C. to 10° C.

It is also important that any such refrigerant has a similar capacity and efficiency as R22.

By similar capacity we mean a capacity that is no more than 20% lower than R22 and preferably not more than 10% lower than R22 at mean evaporating temperatures between −35° C. to −28° C. By similar efficiency we mean not more than 10% lower and preferably not more than 5% lower at mean evaporating temperatures between −35° to −28° C.

SUMMARY

According to the present invention there is provided a refrigerant composition which comprises:

(a) Pentafluoroethane, trifluoromethoxydifluoromethane or hexafluorocyclopropane, or a mixture of two or more thereof, in an amount of from 60 to 70% by weight based on the weight of the composition.

(b) 1,1,1,2- or 1,1,2,2-tetrafluoroethane, trifluoromethoxypentafluoroethane, 1,1,1,2,3,3-heptafluoropropane or a mixture of two or more thereof, in an amount of from 26 to 36% by weight based on the weight of the composition and (c) An ethylenically unsaturated or saturated hydrocarbon, optionally containing one or more oxygen atoms, with a boiling point from −12° C. to +10° C., or a mixture thereof, or a mixture of one or more said hydrocarbons with one or more other hydrocarbons, said mixture having a bubble point from −12° C. to +10° C., in an amount from 1% to 4% by weight based on the weight of the composition. It has surprisingly been fount that these particular formulations have the condition of properties which enable them to be used as a "drop in" replacement for R22.

The percentages quoted above refer, in particular, to the liquid phase. The corresponding ranges for the vapour phase are as follows:

(a) 75 to 87% (b) 10-28% and (c) 0.9-4.1%, all by weight based on the weight of the composition. These percentages preferably apply both in the liquid and vapour phases.

The present invention also provides a process for producing refrigeration which comprises condensing a composition of the present invention and thereafter evaporating the composition in the vicinity of a body to be cooled. The invention also provides a refrigeration apparatus containing, as refrigerant, a composition of the present invention.

DETAILED DESCRIPTION

Figure 1:
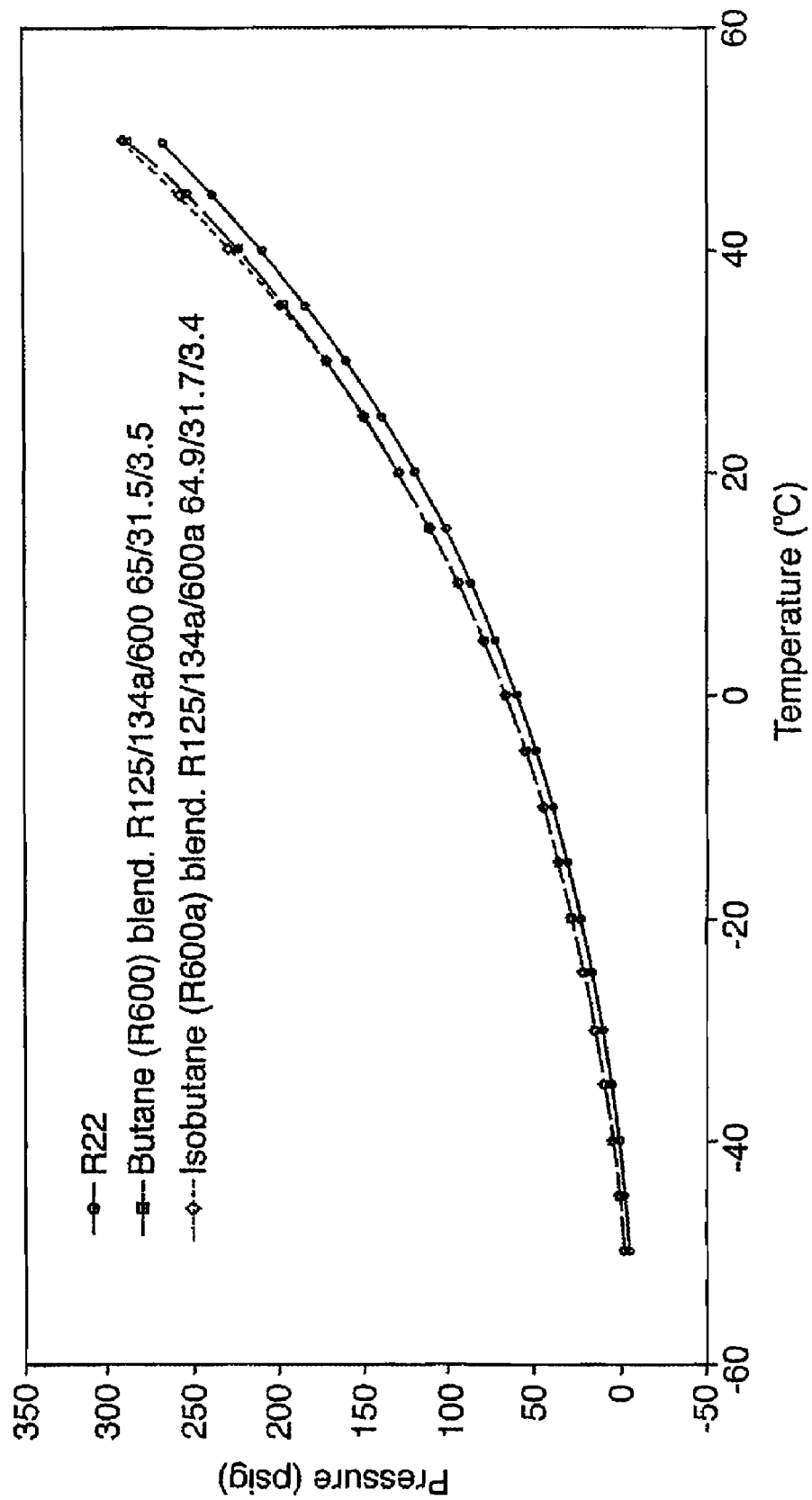
FIG. 1 is a graph showing shows the saturated vapor pressures for the blends investigated along with that for R22.
Figure 2:
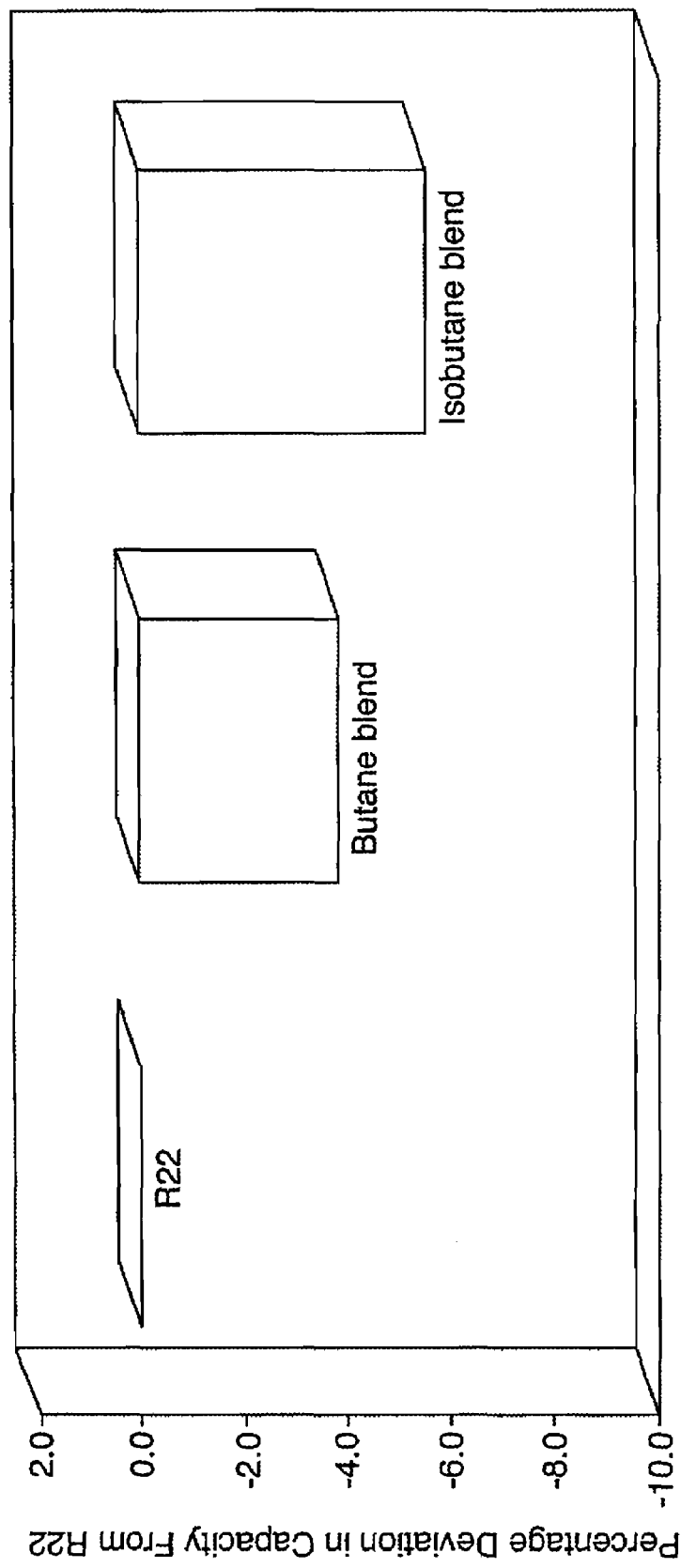
FIG. 2 is a graph shows a comparison of the capacities of selected blends with respect to R22 at a mean evaporating temperature of −30° C.
Figure 3:
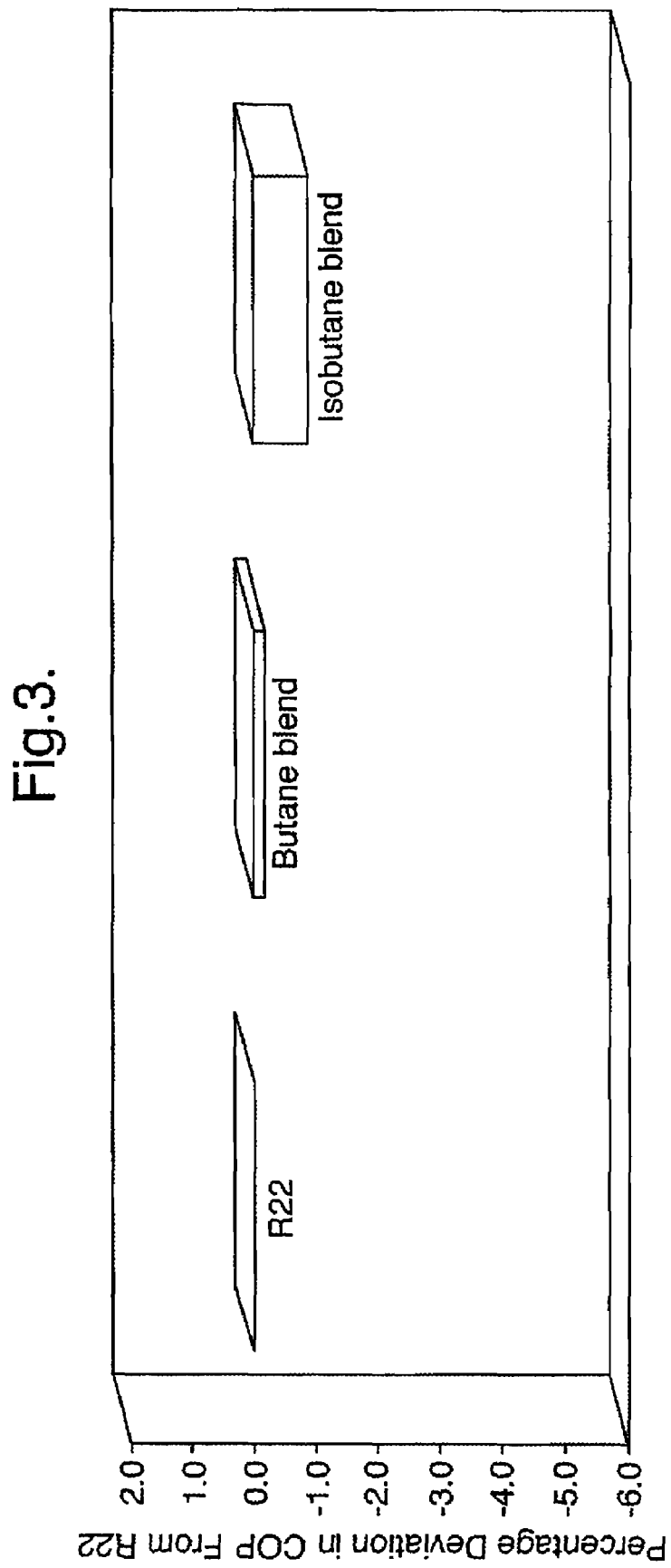
FIG. 3 is a graph showing COP for selected blends.
Figure 4:
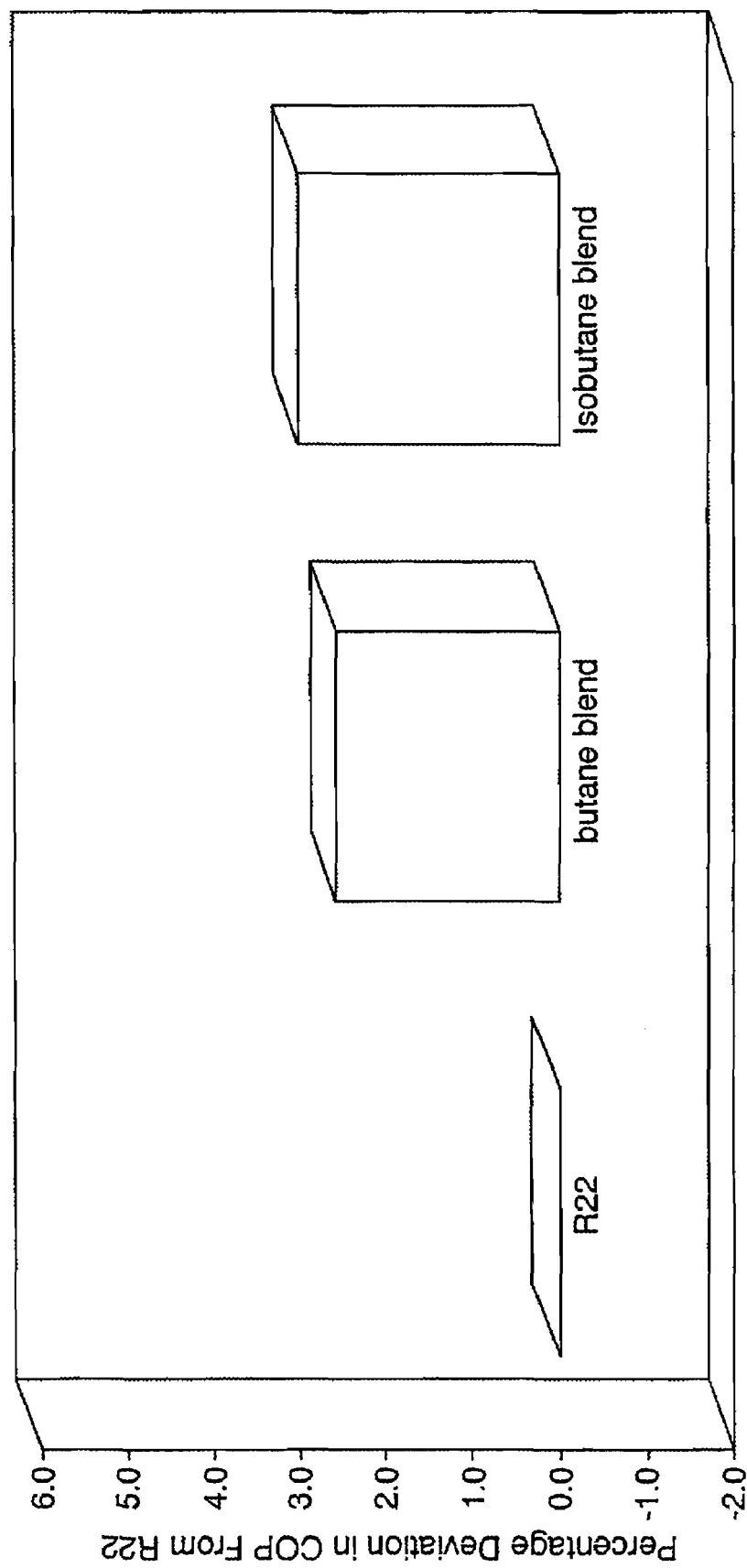
FIG. 4 is a graph the capacity fixed to that of R22.
Figure 5:
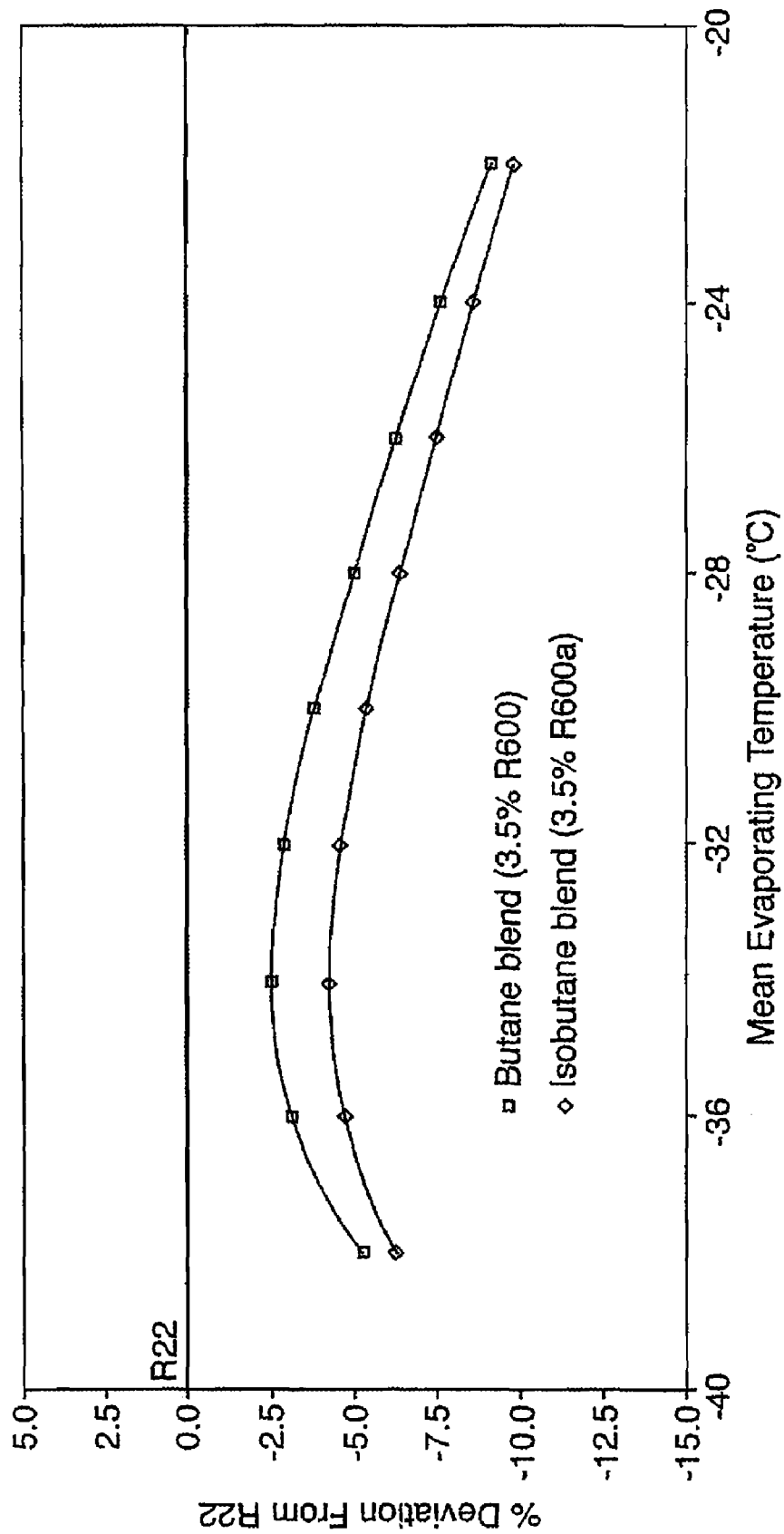
FIG. 5 is a graph showing the capacity of hydrocarbon blends relative to R22.
Figure 6:
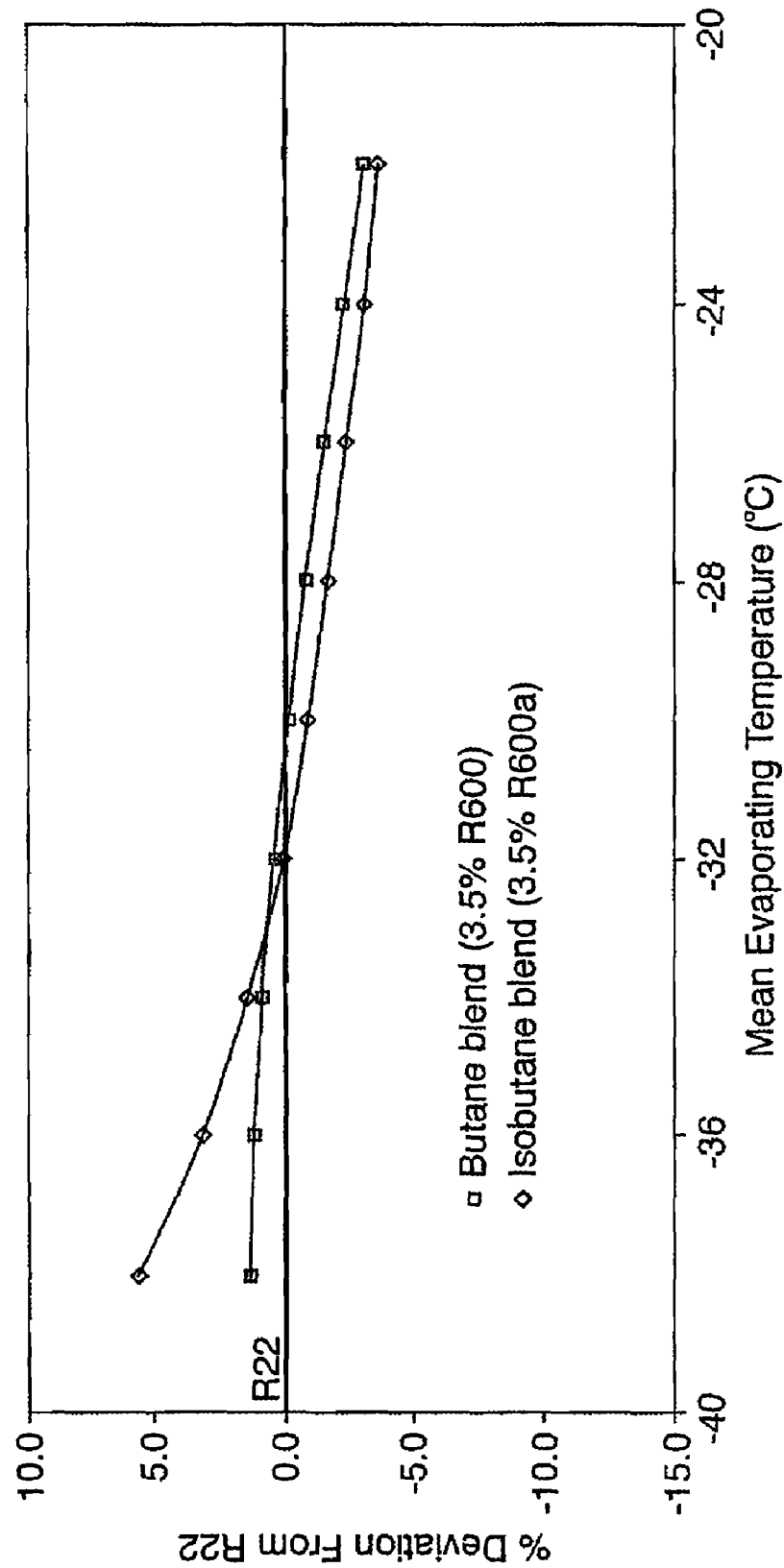
FIG. 6 is a graph comparing the COP of RX blends relative to R22.

Component (a) is present in an amount from 60 to 70% by weight based on the weight of the composition. Preferably, the concentration is 62 to 67%, especially above 64% and up to 66%, by weight. Preferably, component (a) is R125 (pentafluorethane) or a mixture containing at least an half, especially at least three quarters (by mass) of R125. Most preferably component (a) is R125 (alone).

Component (b) is present in the composition in an amount from 26 to 36%, especially 28 to 32%, by weight based on the weight of the composition. Component (b) is preferably a mixture containing at least an half, especially at least three quarters (by mass) of R134a (1,1,1,2-tetrafluoroethane). Most preferably component (b) is R134a (alone).

The weight ratio of component (a): component (b) is desirably at least 1.5:1, preferably 1.5:1 to 3:1 and especially 1.8:1 to 2.2:1.

Component (c) is a saturated or ethylenically unsaturated hydrocarbon, optionally containing one or more oxygen atoms, in particular one oxygen atom, with a boiling point from −12° C. to +10° C., especially −12° C. to −5° C. or a mixture thereof. Preferred hydrocarbons which can be used possess three to five carbon atoms. They can be acyclic or cyclic. Acyclic hydrocarbons which can be used include one or more of propane, n-butane, isobutane and ethylmethyl ether. Cyclic hydrocarbons which can be used include methyl cyclopropane. Preferred hydrocarbons include n-butane and/or isobutane. Component (c) can also be a mixture of such a hydrocarbon with one or more other hydrocarbons, said mixture having a boiling point from −12° C. to +10° C., especially −12° C. to −5° C. Other hydrocarbons which can be used in such mixtures include pentane and isopentane, propene, dimethyl ether, cyclobutane, cyclopropane and oxetan.

The presence of at least one further component in the composition is not excluded. Thus although, typically, the composition will comprise the three essential components, a fourth component, at least, can also be present. Typical further components include other fluorocarbons and, in particular, hydrofluorocarbons, such as those having a boiling point at atmospheric pressure of at most −40° C., preferably at most −49° C., especially those where the F/H ratio in the molecule is at least 1, preferably R23, trifluoromethane and, most preferably, R32, difluoromethane. In general, the maximum concentration of these other ingredients does not exceed 10% and especially not exceeding 5% and more especially not exceeding 2%, by weight, based on the sum of the weights of components (a), (b) and (c). The presence of hydrofluorocarbons generally has a neutral effect on the desired properties of the formulation. Desirably one or more butanes, especially n-butane or iso-butane, represents at least 70%, preferably at least 80% and more preferably at least 90%, by weight of the total weight of hydrocarbons in the composition. It will be appreciated that it is preferable to avoid perhalocarbons so as to minimize any greenhouse effect and to avoid hydrohalogenocarbons with one or more halogens heavier than fluorine. The total amount of such halocarbons should advantageously not exceed 2%, especially 1% and more preferably 0.5%, by weight.

According to a preferred embodiment, the composition comprises, as component (a) 62 to 67% based on the weight of the composition of pentafluoroethane, as component (b) 3 to 35% by weight based on the weight of the composition of 1,1,1,2-tetrafluoroethane and, as component (c), butane and/or isobutane or a said mixture of hydrocarbons comprising butane and/or isobutane in the mixture is preferably at least 50% by weight especially at least 70% by weight, more preferably at least 80% by weight and even more preferably at least 90% by weight, based on the weight of the composition. The other component of the mixture is preferably pentane.

It has been found that the compositions of the present invention are highly compatible with the mineral oil lubricants which have been conventionally used with CFC refrigerants. Accordingly the compositions of the present invention can be used not only with fully synthetic lubricants such as polyol esters (POE), polyalkyleneglycols (PAG) and polyoxypropylene glycols or with fluorinated oil as disclosed in EP-A-399817 but also with mineral oil and alkyl benzene lubricants including naphthenic oils, paraffin oils and silicone oils and mixtures of such oils and lubricants with fully synthetic lubricants and fluorinated oil.

The usual additives can be used including "extreme pressure" and antiwear additives, oxidation and thermal stability improvers, corrosion inhibitors, viscosity index improvers, pour point depressants, detergents, anti-foaming agents and viscosity adjusters. Examples of suitable additives are included in Table D in U.S. Pat. No. 4,755,316.

The following Examples further illustrate the present invention.

EXAMPLES

The samples used for testing are detailed below:
Butane (3.5%) blend: R125/134a/600 (65.0/31.5/3.5)
Isobutane (3.5%) blend: R125/134a/600a (64.9/31.4/3.4)

Equipment and Experimental

The samples, each approximately 600 g, used for the determination of the vapour pressures were prepared in aluminum disposable cans (Drukenbehalter—product 3469), which were then fully submerged in a thermostatically controlled water bath. For each determination the can was charged with about 600 g. A maximum of two samples could be processed at any one time. The bath temperature was measured using a calibrated platinum resistance thermometer (152777/1B) connected to a calibrated Isotech TTI1 indicator. Pressure readings were taken using the two calibrated Druck pressure transducers, DR1 and DR2.

The temperature of the bath was set to the lowest temperature required and it was then left until it had cooled. When the temperature and pressure had remained constant for at least a quarter of an hour they were then recorded. Further temperature and pressure readings were taken in increments of 5° C. to a maximum of 50° C., each time ensuring that they were steady for at least a quarter of an hour before recording them.

The data obtained does not give the dew point and as such does not give the glide. An approximate evaluation of the glide can be obtained by using the REFPROP 6 program. The relationship of the glide to the bubble point can be represented by a polynomial equation. This equation can now be used to give an approximate glide for the experimentally determined bubble points. This is effectively a normalization of the calculated glide to the experimentally determined data. The dew point pressures can then be approximated by subtracting the temperature glide from the temperature in the bubble point equation.

These equations are then used to obtain vapour/pressure tables. The experimental equation derived for the bubble points and the glide equation from REFPROP 6 are shown in Table 1.

Notes:
1. In this equation $x=1/T$, where T is the bubble point in Kelvin: $y=\ln(p)$, where p is the saturated vapour pressure in psia. To convert psia to MPa absolute pressure, multiply by 0.006895.
2. In this equation $x=t$, where t is liquid temperature (bubble point) in degree C. and y=glide in degree C. at the bubble point temperature.
3. The vapour pressures for R22 were obtained from the Ashrae handbook by interpolation.

Determination of the Performance of the Refrigerants on the Low Temperature (LT) Calorimeter.

Equipment and General Operation Conditions

The performance of the refrigerants was determined on the low temperature (LT) calorimeter. The LT calorimeter is fitted with a Bitzer semi-hermetic condensing unit containing Shell SD oil. The hot vapour passes out of the compressor, though an oil separator and into the condenser. The discharge pressure at the exit of the compressor is kept constant by the means of a packed gland shut-off valve. This inevitably has an effect on the condensing pressure/temperature—the system is actually condensing at a temperature below 40° C. The refrigerant then travels alone the liquid line to the evaporator.

The evaporator is constructed from 15 mm Cu tubing coiled around the edges of a well-insulated 32-liter SS bath. The bath is filled with 50:50 glycol:water solution and heat is supplied to it by 3×1 kW heaters controlled by a PID controller. A stirrer with a large paddle ensures that the heat is evenly distributed. The evaporating pressure is controlled by an automatic expansion valve.

The refrigerant vapour returns to the compressor through a suction line heat exchanger.

Twelve temperature readings, five pressure readings, compressor power and heat input are all recorded automatically using Dasylab.

The tests were run at a condensing temperature of 40° C. and an evaporator superheat of 8° C. (±0.5° C.).

For R22 the temperature at the end of the evaporator was maintained at 8° C. above the temperature equivalent to the evaporating pressure (bubble point).

For the other refrigerants the temperature at the end of the evaporator was maintained at 8° C. above the temperature equivalent to the evaporating pressure (Dew Point).

The mean evaporator temperature for these refrigerants was calculated by taking the temperature equivalent to the evaporator pressure from the bubble point table and adding to that half glide at that temperature.

When running the calorimeter the evaporating and condensing pressures are initially set to an approximate value along with the temperature of the bath. The calorimeter is then allowed time for the conditions to stabilize. During this period coarse adjustments can be carried out and it must also be monitored in order to make sure that sufficient heat is being put into the bath to avoid any liquid getting back to the compressor. When the system is virtually steady fine adjustments of pressure and temperature are made until the calorimeter has stabilized at the required evaporating pressure with a condensing pressure equivalent to 40° C. and an evaporator superheat of 8° C. (Note—the superheat is measured from the third evaporator outlet)

The run is then commenced and run for a period of one hour, during which time no adjustments are made to the system, except for possibly minor changes to the condensing pressure to compensate for fluctuations in the ambient temperature.

Specific Experimental Details for Each Refrigerant

R22: The calorimeter was charged with R22 (3.5 kg into the liquid receiver). Ten data points were obtained between the evaporating temperatures of −38° C. and −22° C.

Butane (3.5%) blend: Approximately 3.55 kg were charged into the liquid receiver and five data points were obtained between the mean evaporating temperatures of −38° C. and −22° C.

Isobutane (3.5%) blend: Approximately 3.48 kg of the blend were charged into the liquid receiver of the LT-calorimeter. Five data points between the mean evaporating temperatures of −38° C. and −22° C. were obtained.

Results

The results obtained are summarized in Tables 2-4. Mean Ev.

Temp=Mean evaporation temperature; Air on condenser=temperature of the air blowing over the condenser; Press=pressure.

Comments and Discussion on the Experimental Results

The Results obtained are shown graphically in Graphs 1 to 6. Graph 1 shows the saturated vapour pressure for the blends investigated along with that for R22. The graph shows that the vapour pressures of the blends are only slightly higher than that for R22.

Graph 2 shows a comparison of the capacities with respect to R22 at a mean evaporating temperature of −30° C.—a typical temperature at which these blends would be expected to operate. At this temperature the butane blend is only 4% down on capacity against R22, whereas the capacity of isobutane blend is slightly inferior, being 5.5% down on R22.

The COP results obtained are shown in Graph 3. This graph shows that at a mean evaporating temperature of −30° C. the COP values of both the hydrocarbon blends are less than 1% down on R22.

In Graph 4, the capacity is fixed to that of R22 at the evaporating temperature of −30° C. The COP's at this constant capacity for the different refrigerants can now be compared. The graph shows that both the butane blend (by 2.5%) and the isobutane blend (by 3.0%) are more efficient than R22 for this given capacity.

The capacity of the hydrocarbon blends relative to R22 is shown in Graph 5. The lines for the two blends are parallel to one another and the capacities are similar with that of the isobutane blend being slightly inferior.

Graph 6 shows the COP of the RX blends relative to R22. The COP of R22 and that of the two blends is shown to be similar. The lines of the hydrocarbons blends cross over one another (and R22) at a mean evaporating Temperature of −32° C. showing the increase in the relative COP of R22 and the decrease in the relative COP of the isobutane blend. As before though the differences are only minimal.

TABLE 1

Results of the experimental SVP measurements and the glide from REFPROP 6

| Description | SVP Equation (see note 1) | Glide equation (see note 2) |
|---|---|---|
| Butane (3.5%) blend R125/134a/600 (65.0/31.5/3.5) | y = −2347.46820x + 12.96325 R2 = 0.99999 | y = −0.02618x + 3.51740 R2 = 0.99790 |
| Isobutane (3.5%) blend R125/134a/600a (64.9/31.7/3.4) | y = −2356.045324x + 12999729 R² = 0.999956 | y = −000001x³ − 0.000012x² − 0.028998x + 3.628716 |
| R22 | (see note 3) | Not applicable |

TABLE 2

R22 CONDENSING AT 40° C. IN LT-CALORIMETER

| Mean Ev. Temp ° C. | Discharge Temp ° C. | Air On Condenser ° C. | Discharge absolute Press Mpa | Condensing Temp ° C. | Evaporator Inlet Press MPa | Evap Temp BUBBLE ° C. | Evap Temp DEW ° C. | Compressor Power kwh | Capacity Heat Input kwh | C.O.P. | Evap. Superheat ° C. |
|---|---|---|---|---|---|---|---|---|---|---|---|
| −37.6 | 149.9 | 20.8 | 1.439 | 40.1 | 0.016 | −37.6 | −37.6 | 1.161 | 0.614 | 0.53 | 8.3 |
| −35.9 | 154.5 | 22.3 | 1.425 | 39.8 | 0.025 | −35.9 | −35.9 | 1.208 | 0.846 | 0.70 | 8.5 |
| −34.0 | 156.1 | 22.2 | 1.433 | 40.0 | 0.036 | −34.0 | −34.0 | 1.283 | 1.031 | 0.80 | 8.3 |
| −31.6 | 156.3 | 22.9 | 1.438 | 40.1 | 0.051 | −31.6 | −31.6 | 1.375 | 1.282 | 0.93 | 8.3 |
| −29.5 | 155.7 | 23.4 | 1.450 | 40.4 | 0.065 | −29.5 | −29.5 | 1.388 | 1.412 | 1.02 | 7.8 |
| −28.8 | 152.8 | 22.0 | 1.447 | 40.4 | 0.071 | −28.8 | −28.8 | 1.418 | 1.508 | 1.06 | 8.1 |
| −28.1 | 154.7 | 23.9 | 1.430 | 39.9 | 0.076 | −28.1 | −28.1 | 1.457 | 1.586 | 1.09 | 8.4 |
| −25.4 | 152.7 | 22.7 | 1.449 | 40.4 | 0.096 | −25.4 | −25.4 | 1.593 | 1.992 | 1.25 | 8.0 |
| −24.0 | 152.8 | 23.8 | 1.446 | 40.3 | 0.108 | −24.0 | −24.0 | 1.646 | 2.167 | 1.32 | 8.6 |
| −22.1 | 149.6 | 23.8 | 1.450 | 40.4 | 0.124 | −22.1 | −22.1 | 1.688 | 2.387 | 1.41 | 8.4 |

TABLE 3

BUTANE (3.5%) CONDENSING AT 40° C. IN LT-CALORIMETER

| Mean Ev. Temp ° C. | Discharge Temp ° C. | Air On Condenser ° C. | Discharge absolute Press MPa | Condensing Temp ° C. | Evaporator Inlet absolute press MPa | Evap Temp BUBBLE ° C. | Evap Temp DEW ° C. | Compressor Power kwh | Capacity Heat Input kwh | C.O.P. | Evap. Super-heat ° C. | Total Super-heat ° C. |
|---|---|---|---|---|---|---|---|---|---|---|---|---|
| −37.4 | 114.1 | 20.8 | 1.528 | 39.9 | 0.025 | −39.7 | −35.1 | 1.094 | 0.629 | 0.58 | 7.7 | 47.0 |
| −34.2 | 115.8 | 21.6 | 1.529 | 39.9 | 0.044 | −36.4 | −31.9 | 1.237 | 0.976 | 0.79 | 7.9 | 43.5 |
| −30.4 | 112.1 | 21.1 | 1.539 | 40.2 | 0.068 | −32.6 | −28.3 | 1.336 | 1.317 | 0.99 | 7.8 | 39.7 |
| −25.9 | 108.9 | 21.4 | 1.540 | 40.2 | 0.102 | −28.0 | −23.8 | 1.459 | 1.729 | 1.18 | 8.0 | 36.7 |
| −22.5 | 106.8 | 22.6 | 1.543 | 40.3 | 0.132 | −24.6 | −20.4 | 1.592 | 2.161 | 1.36 | 8.3 | 35.5 |

TABLE 4

ISOBUTANE BLEND (3.5%) CONDENSING AT 40° C. IN LT-CALORIMETER

| Mean Ev. Temp ° C. | Discharge Temp ° C. | Air On Condenser ° C. | Discharge absolute Press MPa | Condensing Temp ° C. | Evaporator Inlet absolute press. MPa | Evap Temp BUBBLE ° C. | Evap Temp DEW ° C. | Compressor Power kwh | Capacity Heat Input kwh | C.O.P. | Evap. Super-heat ° C. | Total Super-heat ° C. |
|---|---|---|---|---|---|---|---|---|---|---|---|---|
| −37.7 | 114.6 | 23.1 | 1.544 | 40.0 | 0.023 | −40.1 | −35.3 | 1.033 | 0.596 | 0.58 | 8.0 | 49.0 |
| −34.3 | 116.2 | 23.2 | 1.544 | 39.9 | 0.043 | −36.6 | −31.9 | 1.194 | 0.950 | 0.80 | 8.3 | 44.8 |
| −29.8 | 113.1 | 22.2 | 1.544 | 40.0 | 0.072 | −32.1 | −27.5 | 1.353 | 1.361 | 1.01 | 8.5 | 40.1 |
| −26.2 | 109.7 | 22.4 | 1.538 | 39.8 | 0.100 | −28.4 | −23.9 | 1.440 | 1.682 | 1.17 | 8.6 | 37.7 |
| −21.5 | 106.4 | 24.2 | 1.562 | 40.4 | 0.140 | −23.6 | −19.3 | 1.622 | 2.252 | 1.39 | 8.2 | 35.4 |

The invention claimed is:

1. A nonflammable refrigerant composition consisting of:
   (a) pentafluoroethane in an amount from 62-70% based on the weight of the composition;
   (b) 1,1,1,2-tetrafluoroethane, 1,1,2,2-tetrafluoroethane, or a mixture thereof in an amount from 26 to 36% by weight based on the weight of the composition; and
   (c) a mixture of dimethylether and n-butane in an amount of from 1-4% by weight based on the weight of the composition.

2. The composition according to claim 1 in which component (a) is present in an amount of about 62% to about 67% by weight based on the weight of the composition.

3. The composition according to claim 1 in which component (b) is present in an amount about 28% to about 32% by weight based on the weight of the composition.

4. A refrigeration apparatus containing, as refrigerant, a composition as claimed in claim 1.

5. A nonflammable refrigerant composition consisting of:
   (a) pentafluoroethane in an amount from 62-70% based on the weight of the composition;
   (b) 1,1,1,2-tetrafluoroethane, 1,1,2,2-tetrafluoroethane, or a mixture thereof in an amount from 26 to 36% by weight based on the weight of the composition;
   (c) a mixture of dimethylether and n-butane in an amount of from 1-4% by weight based on the weight of the composition; and
   (d) at least one lubricant.

6. The nonflammable composition, according to claim 5, wherein at least one lubricant is selected from the group consisting of mineral oils, alkylbenzene lubricants, synthetic lubricants, and fluorinated oils and mixtures thereof.

7. A refrigeration apparatus containing, as refrigerant, a composition as claimed in claim 5.

8. A nonflammable refrigerant composition consisting of:
   (a) pentafluoroethane in an amount from 62-70% based on the weight of the composition;
   (b) 1,1,1,2-tetrafluoroethane, 1,1,2,2-tetrafluoroethane, or a mixture thereof in an amount from 26 to 36% by weight based on the weight of the composition;
   (c) a mixture of dimethylether and n-butane in an amount of from 1-4% by weight based on the weight of the composition;
   (d) at least one lubricant; and
   (e) at least one additive.

9. The nonflammable composition, according to claim 8, wherein at least one lubricant is selected from the group consisting of mineral oils, alkylbenzene lubricants, synthetic lubricants, and fluorinated oils and mixtures thereof; and at least one additive is selected from the group consisting of extreme pressure, antiwear improvers, oxidation inhibitors, thermal stability improvers, corrosion inhibitors improvers, viscosity index improvers, pour point depressants, detergents, anti-foaming agents, and viscosity adjusters.

10. A refrigeration apparatus containing, as refrigerant, a composition as claimed in claim 8.

11. A nonflammable refrigerant composition consisting of:
    (a) pentafluoroethane in an amount from 62-70% based on the weight of the composition;

(b) 1,1,1,2-tetrafluoroethane in an amount from 26 to 36% by weight based on the weight of the composition; and
(c) a mixture of dimethylether and n-butane in an amount of from 1-4% by weight based on the weight of the composition; and
(d) at least one additive.

12. The nonflammable composition according to claim 11, wherein at least one additive is selected from the group consisting of extreme pressure, antiwear improvers, oxidation inhibitors, thermal stability improvers, corrosion inhibitors improvers, viscosity index improvers, pour point depressants, detergents, anti-foaming agents, and viscosity adjusters.

13. A refrigeration apparatus containing, as refrigerant, a composition as claimed in claim 11.

* * * * *